(12) United States Patent
Yao et al.

(10) Patent No.: US 6,751,069 B2
(45) Date of Patent: Jun. 15, 2004

(54) METHOD AND APPARATUS FOR IMPROVED ATTACHMENT OF A MICRO-ACTUATOR TO A SLIDER DEVICE

(75) Inventors: Ming Gao Yao, Dongguan (CN); Masashi Shiraishi, Dongguan (CN)

(73) Assignee: SAE Magnetics (H.K.) Ltd., Kwai Chung (HK)

(*) Notice: Subject to any disclaimer, the term of this patent is extended or adjusted under 35 U.S.C. 154(b) by 0 days.

(21) Appl. No.: 10/075,742

(22) Filed: Feb. 13, 2002

(65) Prior Publication Data

US 2002/0126420 A1 Sep. 12, 2002

(30) Foreign Application Priority Data

Mar. 11, 2001 (WO) .............................. PCT/CN01/01527

(51) Int. Cl.[7] .................................................. G11B 5/56
(52) U.S. Cl. .................................. 360/294.4; 360/234.6
(58) Field of Search ........................... 360/294.4, 294.3, 360/234.6

(56) References Cited

U.S. PATENT DOCUMENTS

| | | | |
|---|---|---|---|
| 5,325,463 A | 6/1994 | Murata et al. ............. | 395/2.75 |
| 5,673,161 A | 9/1997 | Yanagisawa et al. ........ | 360/103 |
| 6,002,549 A | 12/1999 | Berman et al. ............. | 360/104 |
| 6,198,606 B1 | 3/2001 | Boutaghou et al. ......... | 360/294.3 |
| 6,246,552 B1 * | 6/2001 | Soeno et al. ............. | 360/294.4 |
| 6,414,823 B1 * | 7/2002 | Crane et al. ............. | 360/294.5 |
| 6,574,077 B1 * | 6/2003 | Crane et al. ............. | 360/294.3 |
| 6,590,747 B1 * | 7/2003 | Boutaghou et al. ......... | 360/294.3 |
| 6,611,399 B1 * | 8/2003 | Mei et al. ................ | 360/234.7 |
| 2002/0141117 A1 * | 10/2002 | Kasajima et al. ......... | 360/294.4 |
| 2003/0053264 A1 * | 3/2003 | Chen et al. ............. | 360/294.4 |
| 2003/0095361 A1 * | 5/2003 | Shimanouchi et al. ... | 360/294.4 |
| 2003/0147181 A1 * | 8/2003 | Shiraishi et al. ......... | 360/294.4 |
| 2003/0147182 A1 * | 8/2003 | Yao et al. ................ | 360/294.4 |

FOREIGN PATENT DOCUMENTS

| | | | | |
|---|---|---|---|---|
| JP | A 8249849 | 9/1996 | ............ | G11B/21/21 |

* cited by examiner

*Primary Examiner*—Jefferson Evans
(74) *Attorney, Agent, or Firm*—Kenyon & Kenyon

(57) ABSTRACT

A system and method for improving the process of attaching a hard disk microactuator to a slider device with a bonding agent such as epoxy, the slider having design characteristics to avoid various problems associated with bonding said components with a bonding agent such as epoxy.

21 Claims, 12 Drawing Sheets

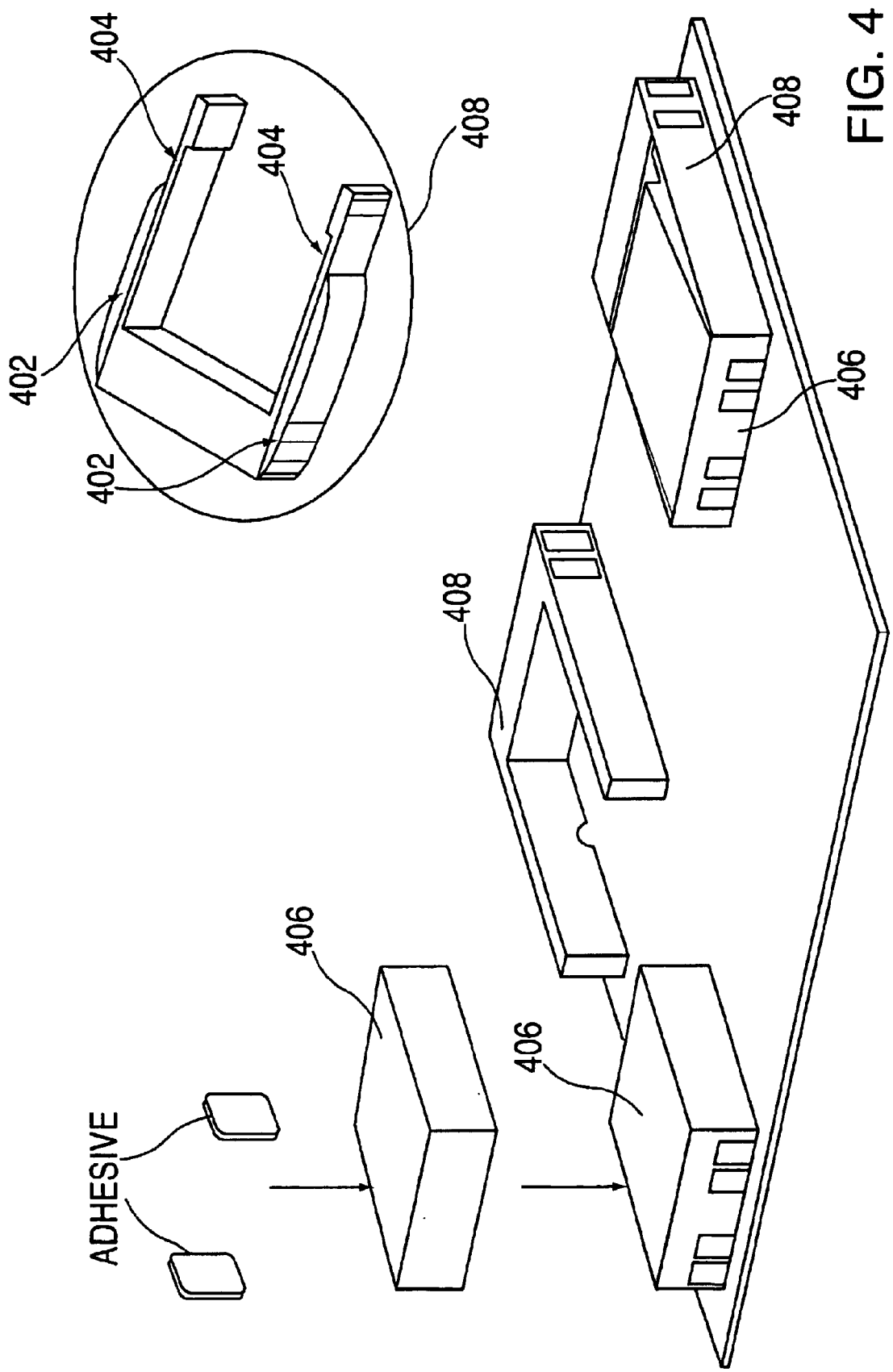

METHOD AND APPARATUS FOR IMPROVED ATTACHMENT OF A MICRO-ACTUATOR TO A SLIDER DEVICE

BACKGROUND INFORMATION

The present invention relates to magnetic hard disk drives. More specifically, the present invention relates to a system for attachment of a hard disk micro-actuator to a slider device.

In the art today, different methods are utilized to improve recording density of hard disk drives. FIG. 1 provides an illustration of a typical drive arm configured to read from and write to a magnetic hard disk. Typically, voice-coil motors (VCM) 102 are used for controlling a hard drive's arm 104 motion across a magnetic hard disk 106. Because of the inherent tolerance (dynamic play) that exists in the placement of a recording head 108 by a VCM 102 alone, microactuators 110 are now being utilized to 'fine-tune' head 108 placement, as is described in U.S. Pat. No. 6,198,606. A VCM 102 is utilized for course adjustment and the micro-actuator then corrects the placement on a much smaller scale to compensate for the VCM's 102 (with the arm 104) tolerance. This enables a smaller recordable track width, increasing the 'tracks per inch' (TPI) value of the hard drive (increased drive density).

FIG. 2 provides an illustration of a micro-actuator as used in the art. Typically, a slider 202 (containing a read/write magnetic head; not shown) is utilized for maintaining a prescribed flying height above the disk surface 106 (See FIG. 1). Micro-actuators may have flexible beams 204 connecting a support device 206 to a slider containment unit 208 enabling slider 202 motion independent of the drive arm 104 (See FIG. 1). An electromagnetic assembly or an electromagnetic/ferromagnetic assembly (not shown) may be utilized to provide minute adjustments in orientation/location of the slider/head 202 with respect to the arm 104 (See FIG. 1).

Attachment of a slider assembly to a micro-actuator can be difficult and/or expensive due to the dimensions within which it must occur. Bonding means must be very precise. It is therefore desirable to have a system for attachment of a hard disk micro-actuator to a slider device that improves the precision and consistency of slider bonding operations.

BRIEF DESCRIPTION OF THE DRAWINGS

FIG. 4 provides an exploded, detailed illustration of a slider with a 'U'-shaped microactuator under principles of the present invention.

DETAILED DESCRIPTION

Figure 1:
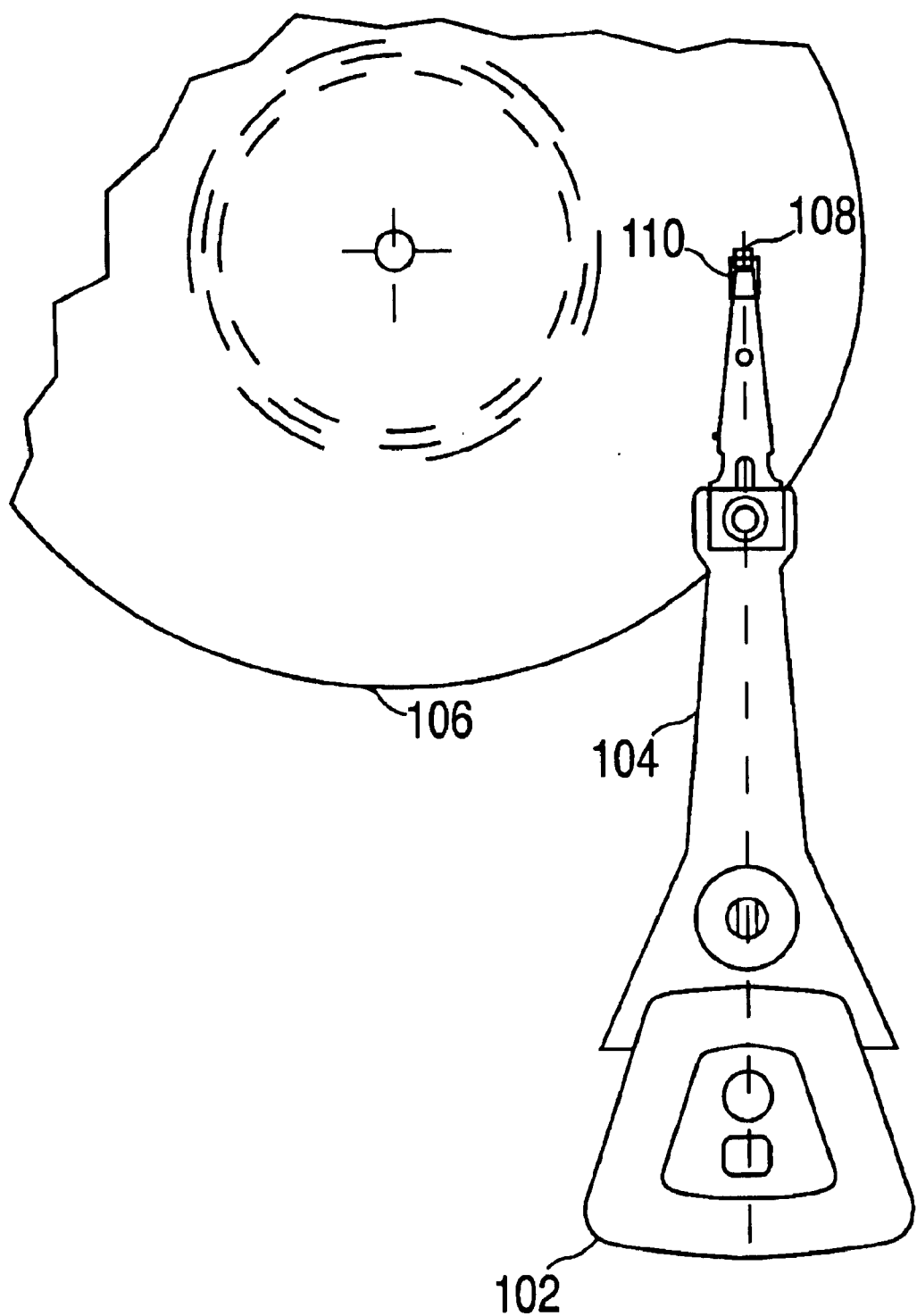
FIG. 1 provides an illustration of a drive arm configured to read from and write to a magnetic hard disk as used in the art.
Figure 2:
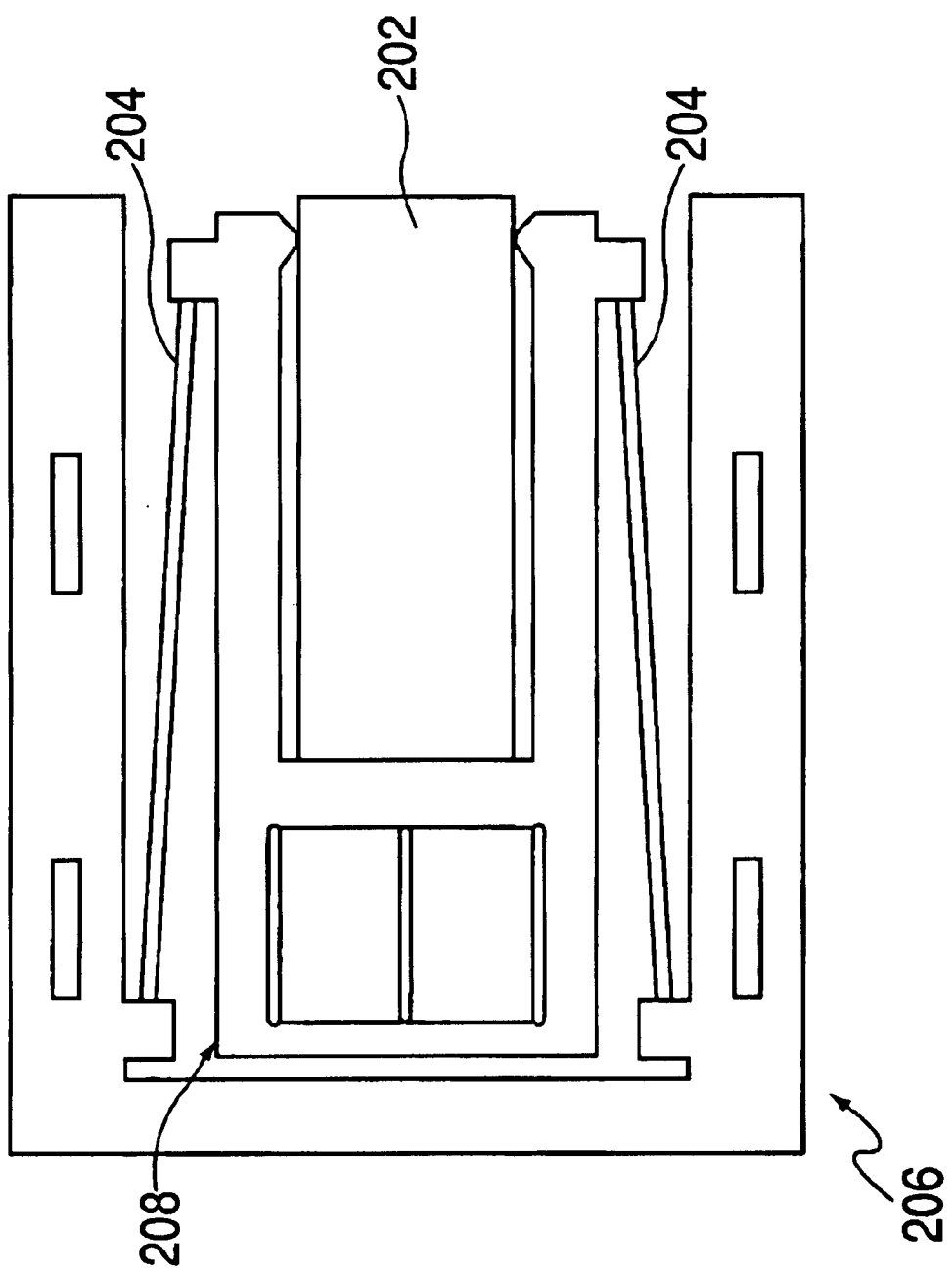
FIG. 2 provides an illustration of a micro-actuator as used in the art.
Figure 3:
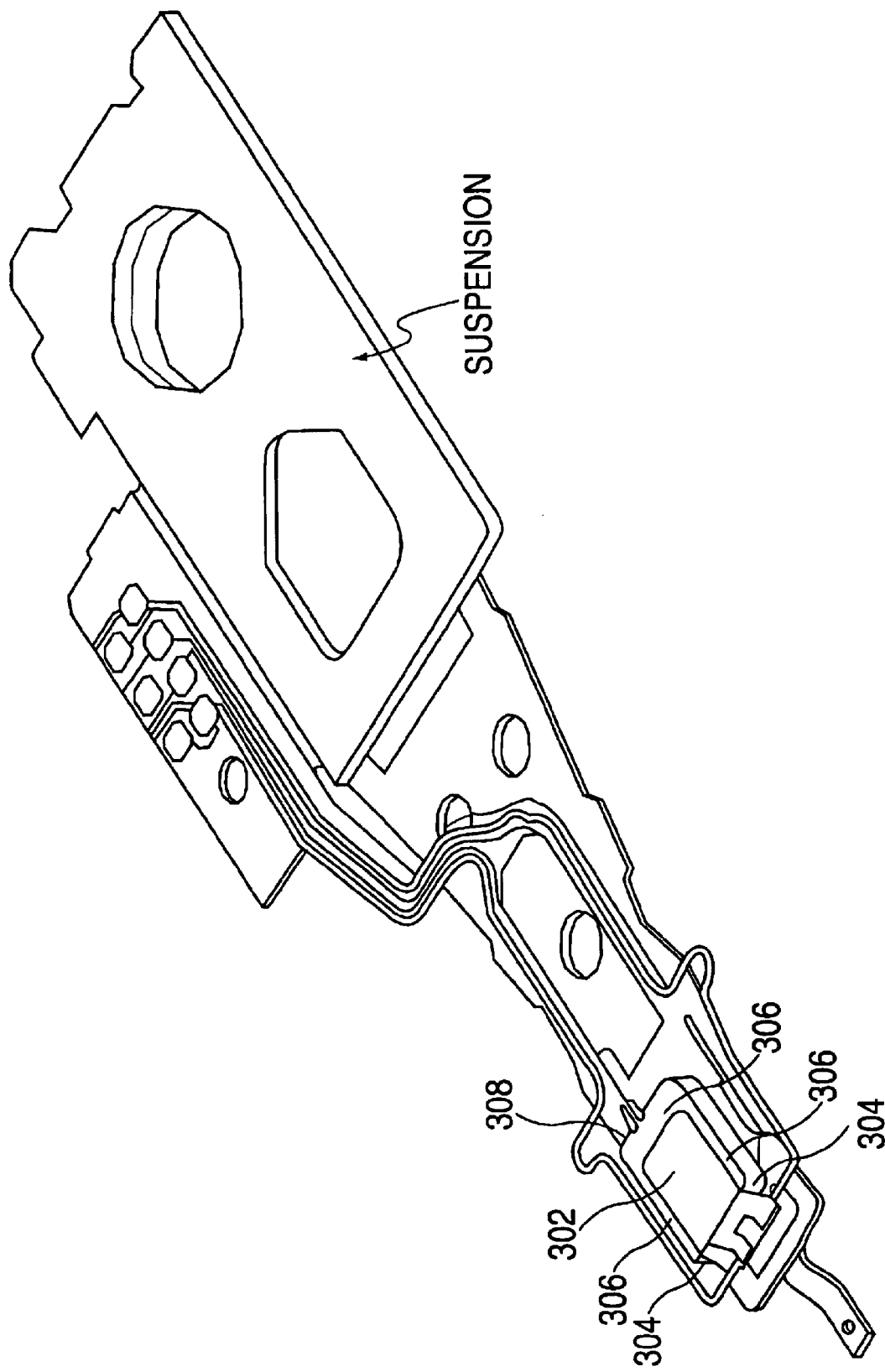
FIG. 3 describes a hard disk drive head gimbal assembly (HGA) with a 'U'-shaped micro-actuator under principles of the present invention.

Illustrated in an upside-down orientation, FIG. 3 describes a hard disk drive head gimbal assembly (HGA) with a 'U'-shaped micro-actuator under principles of the present invention. In one embodiment, a slider 302 is bonded at two points 304 to a 'U'-shaped micro-actuator 306. Further, in an embodiment, the 'U'-shaped micro-actuator has a piezoelectric PZT (Lead Zirconate Titanate) beam (arm) 306 on each side of a Zirconia support frame (actuator base) 308.

FIG. 4 provides an exploded, detailed illustration of a slider with a 'U'-shaped microactuator under principles of the present invention. PZT material has an anisotropic structure whereby the charge separation between the positive and negative ions provides for electric dipole Nits behavior. When a potential is applied across a poled piezoelectric material, Weiss domains increase their alignment proportional to the voltage, resulting in structural deformation (i.e. regional expansion/contraction) of the PZT material. As the PZT structures 402 bend (in unison), the Zirconia arms 404, which are bonded to the PZT structures 402, bend also, causing the slider 406 to adjust its position in relation to the micro-actuator 408 (for magnetic head fine adjustments).

Figure 5B:
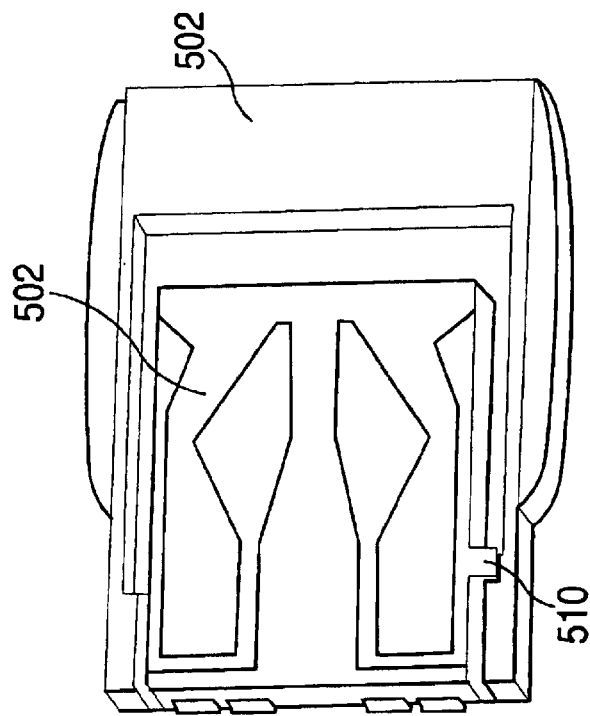
FIG. 5 provides an illustration of two different problems involved with the process of bonding a slider to a 'U'-shaped micro-actuator by a bonding agent such as epoxy.
Figure 5A:
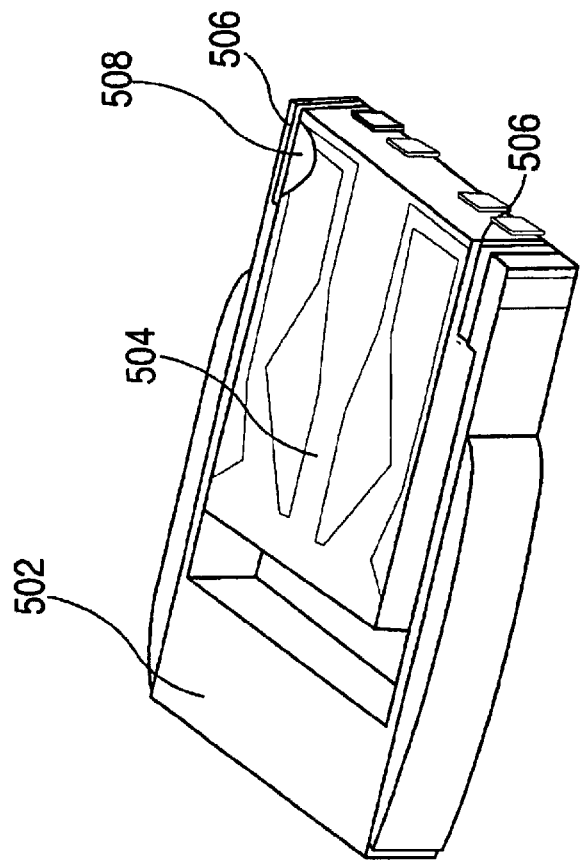

FIG. 5 provides an illustration of two different problems involved with the process of bonding a slider to a 'U'-shaped micro-actuator by a bonding agent such as epoxy. A 'U'shaped micro-actuator 502 is attached to a slider device 504 at two points 506 by epoxy. FIG. 5a illustrates a problem involving an overflow of epoxy during the bonding process. While the epoxy is curing, it is possible for an amount of epoxy to overflow 508 onto the slider surface. Because of the dimensional scale of the device, it is difficult to consistently apply a precise amount of epoxy (or other bonding agent). If a surplus of epoxy is provided, it may overflow 506 onto the surface of the slider 504. This can affect the flying height of the slider 504, which could cause magnetic interaction outside of the desired track (too high) or cause disk surface damage (too low). FIG. 5b provides a description of a problem with epoxy overflowing beyond the desired contact patch 506 to a location 510 in which it can bind and restrict slider 504 motion with respect to the micro-actuator 502 or it can cause slider 502 motion asymmetry (with respect to the micro-actuator).

Figure 6B:
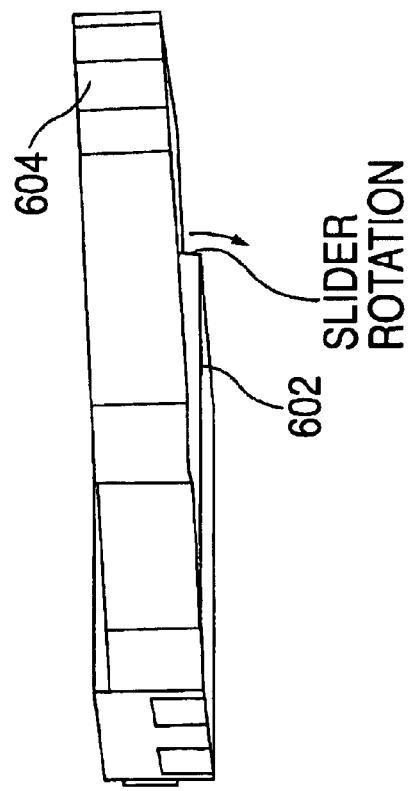
FIG. 6 provides an illustration of two other problems involved with utilizing a bonding agent such as epoxy.
Figure 6A:
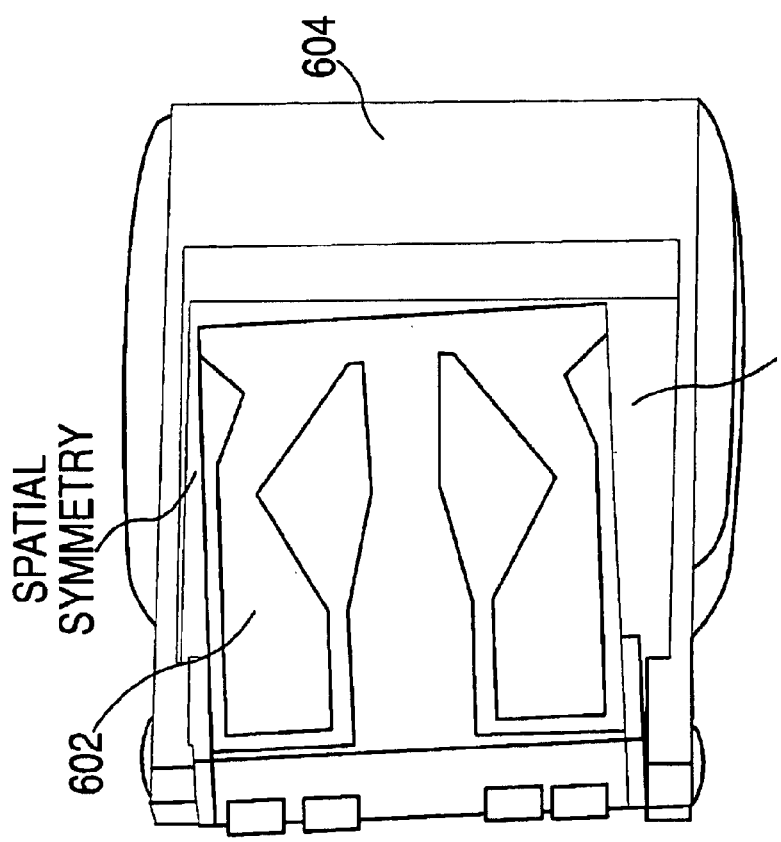

FIG. 6 provides an illustration of two other problems involved with utilizing a bonding agent such as epoxy. As seen in FIG. 6a, the slider 602 may shift with respect to the microactuator 604 while the epoxy is curing, causing spatial asymmetry of the slider 602 with respect to the micro-actuator 604. This can cause problems during operation such as limiting the slider's 602 range of motion with respect to the micro-actuator 604. Similarly, as seen in FIG. 6b, the slider 602 may shift with respect to the micro-actuator 604 while the epoxy is curing, causing slider 602 rotation with respect to the micro-actuator 604. The resulting slider 602 orientation may adversely affect slider 602 flying height as well as flight control. Further, it may cause the slider 602 to come into contact with the suspension during slider 602 operation.

Figure 7A:
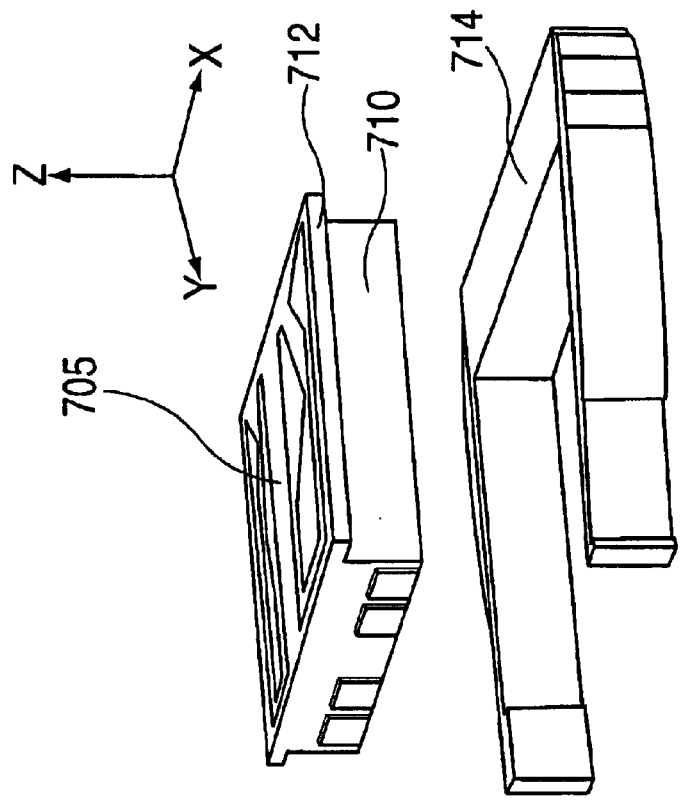
FIG. 7 illustrates design improvements to correct the slider asymmetry and rotation problems under principles of the present invention.
Figure 7B:
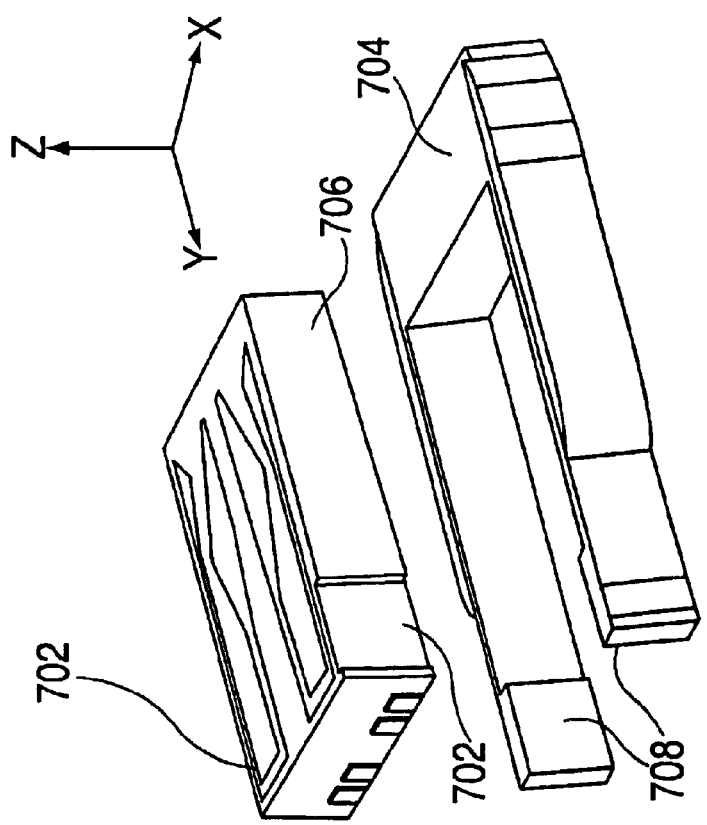

FIG. 7 illustrates design improvements to correct the slider asymmetry/rotation problem illustrated in FIG. 6 under principles of the present invention. Design 1, as depicted in FIG. 7a, prevents the rotation and asymmetry problem. In one embodiment of the present invention, a recessed area 702 is formed in opposite sides of the slider 706, which accepts a raised area 708 on each arm of the micro-actuator 704, thus preventing rotational motion with respect to the micro-actuator in either the Z-X plane or Z-Y plane. Design 2, as depicted in FIG. 7b, prevents the rotation problem. In one embodiment, a step 710 is created in opposite sides of the slider 705, which leaves a lip 712 on each side of the slider 705 that overlaps the arms of the microactuator 714, thus preventing rotational motion with respect to the micro-actuator in the Z-Y plane.

Figure 8B:
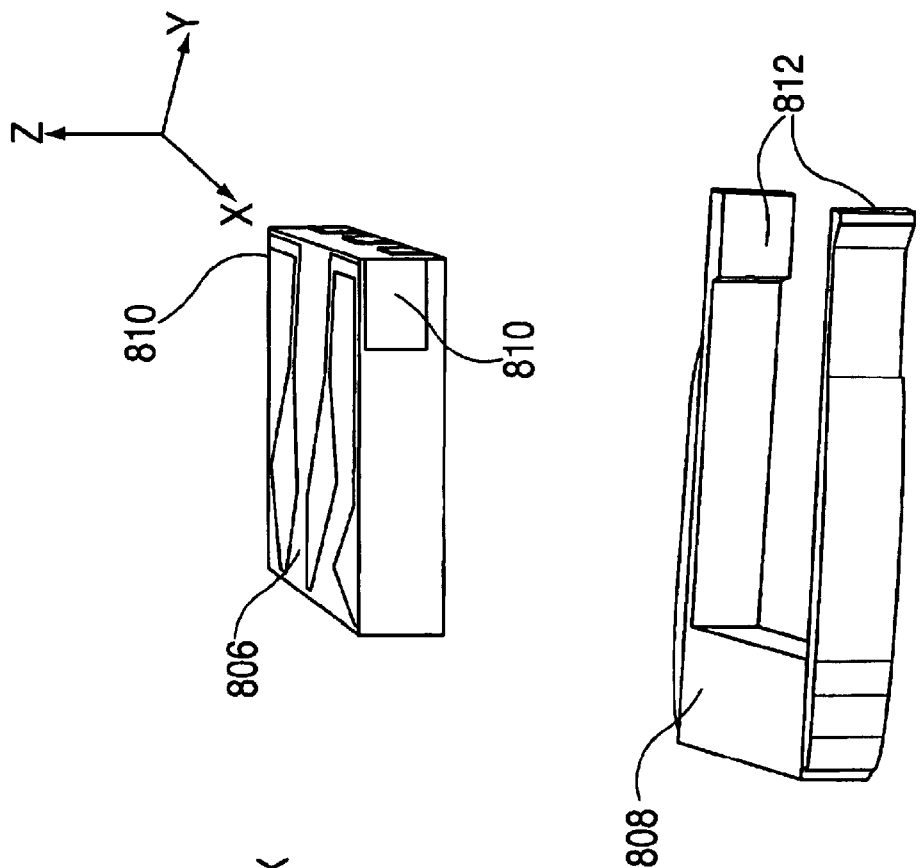
FIG. 8 illustrates design improvements to correct the rotation problem as well as the overflow problem under principles of the present invention.
Figure 8A:
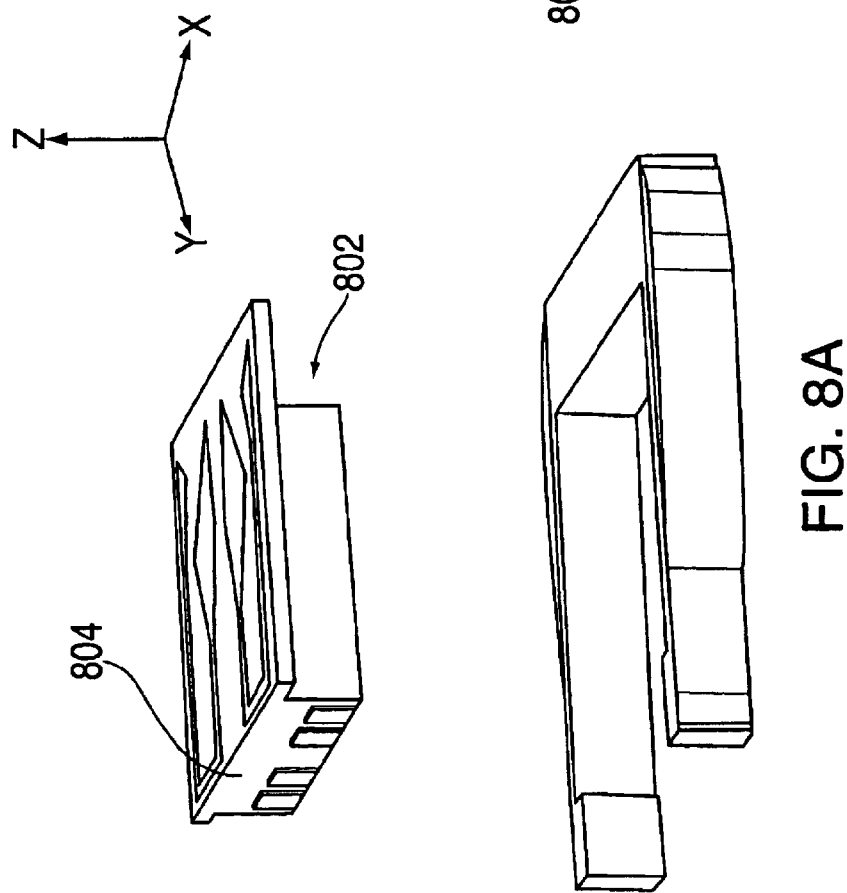

FIG. 8 illustrates further design improvements to correct the rotation problem as well as the overflow problem associated with slider bondage by agents such as epoxy under principles of the present invention. Design 3, as depicted in FIG. 8a, prevents the rotation problem in the same manner as Design 2 (See FIG. 7b). Further, in one embodiment, an additional step 802 is created in the leading edge of the slider 804, which provides slider 804 weight savings, reducing inertial forces and thus improving responsiveness as well as accuracy.

Design 4, as depicted in FIG. 8b, prevents the epoxy overflow problems illustrated in FIGS. 5a and 5b. As stated previously, the dimensional scale of the slider 806 and microactuator 808 makes it difficult to consistently apply precise amounts of epoxy (or other bonding agent). If a surplus of epoxy is provided, it may overflow onto the surface of the slider during curing (See FIG. 5). In one embodiment of the present invention, a recessed area 810 of decreasing depth in the 'Z' direction is created on either side of the slider 806, yielding a partial cleft between the slider 806 and the micro-actuator 808 when placed together. The partial cleft 810 prevents epoxy from being squeezed out onto the slider surface 806. The raised area 812 of each micro-actuator 808 arm cannot enter the partial cleft because of its decreasing depth in the 'Z' direction. In addition, in an embodiment the increased room for epoxy makes a stronger bond possible.

Figure 9:
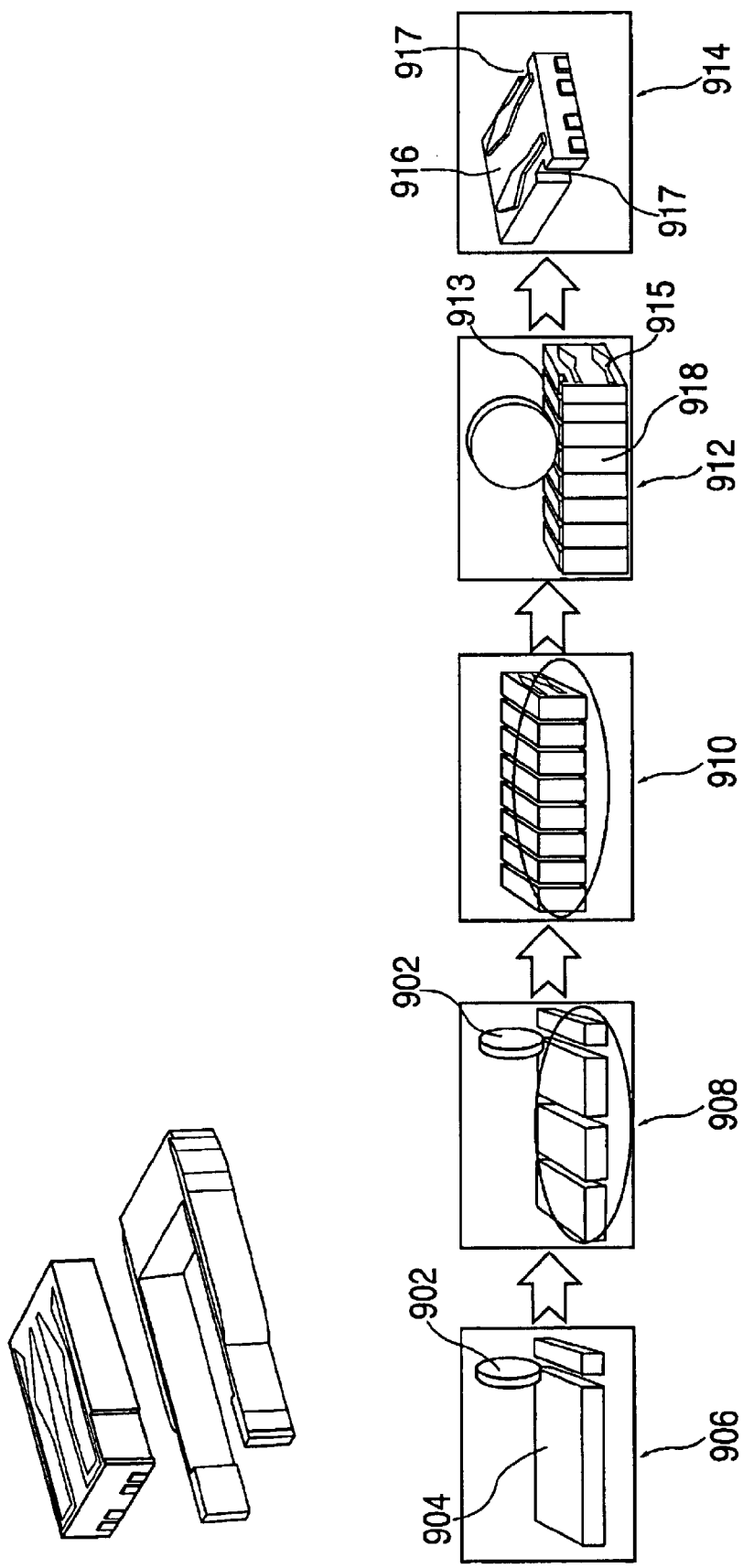
FIG. 9 illustrates the fabrication of a first slider design under principles of the present invention.

FIG. 9 illustrates the fabrication of Design 1 under principles of the present invention. In one embodiment, a cutting wheel 902 is utilized to cut a row bar of slider material 904. The bar 904 is cut 906 in a direction perpendicular to the length (axis) of the bar 904. In an embodiment, this process is repeated 908 and the individual sub-bars are re-joined 910 by a bonding agent. In one embodiment, a shallow groove 913 is cut into one side of the re-joined bar 918, and then into the other side 915 of the bar 918 lengthwise. Next, individual sliders 916 are yielded by separating the sub-bars (from the bar 918), each slider 916 having the appropriately recessed plane 917 on each side for joinder with a 'U'-shaped mico-actuator (not shown).

Figure 10:
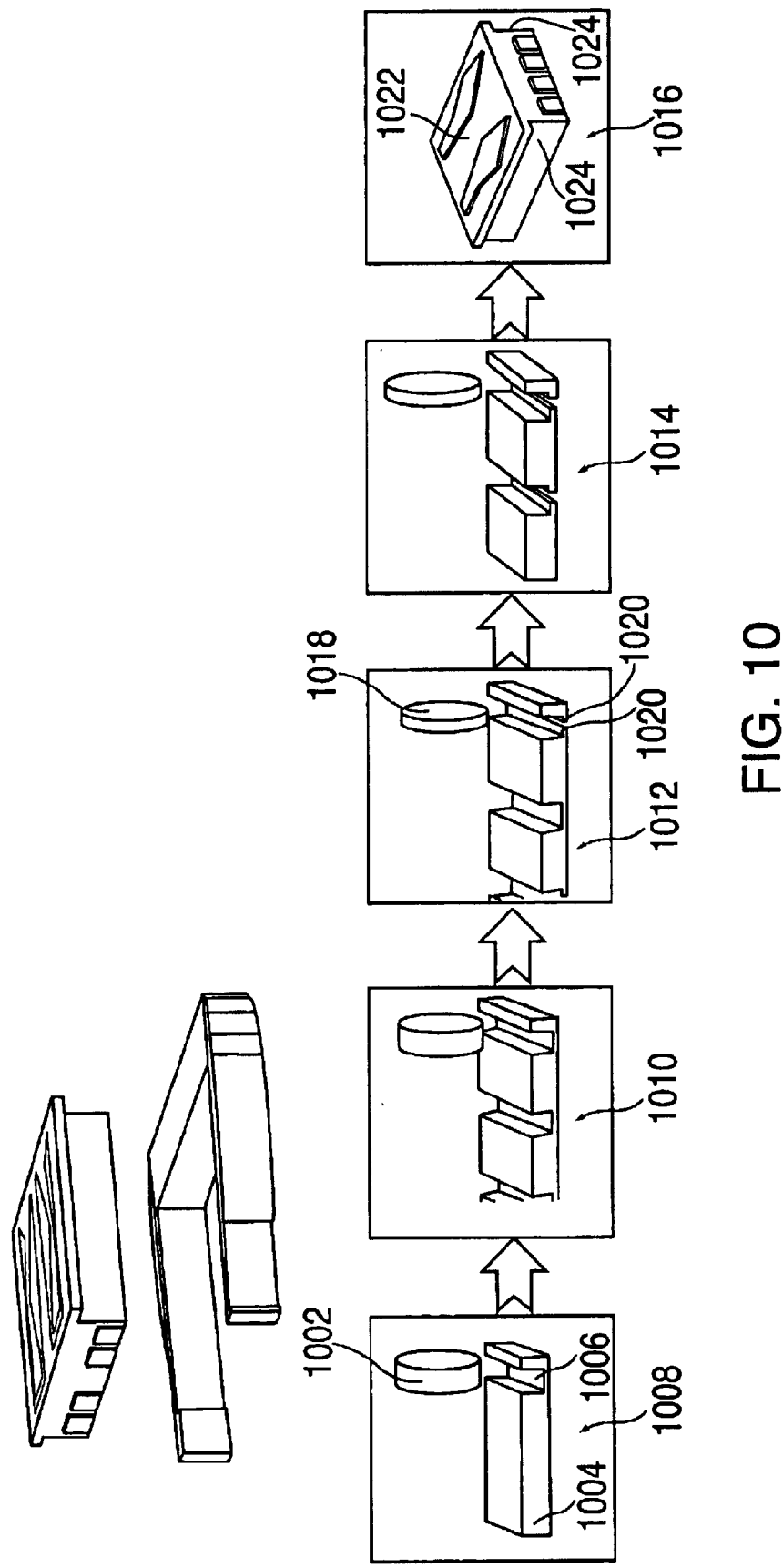
FIG. 10 illustrates the fabrication of a second slider design under principles of the present invention.

FIG. 10 illustrates the fabrication of Design 2 under principles of the present invention. In one embodiment, a cutting wheel 1002 is utilized to cut 1008 a groove 1006 in a row bar of slider material 1004. The bar 1004 is cut to a prescribed depth in a direction perpendicular to the length (axis) of the bar 1004, yielding said groove 1006. The process is repeated 1010 with a prescribed separation between grooves. In an embodiment, the bar is next cut completely through 1012 with a thinner cutting wheel 1018, yielding steps 1020 on each separated unit. This process is repeated 1014, yielding 1016 individual sliders 1022, having steps 1024 on each side.

Figure 11:
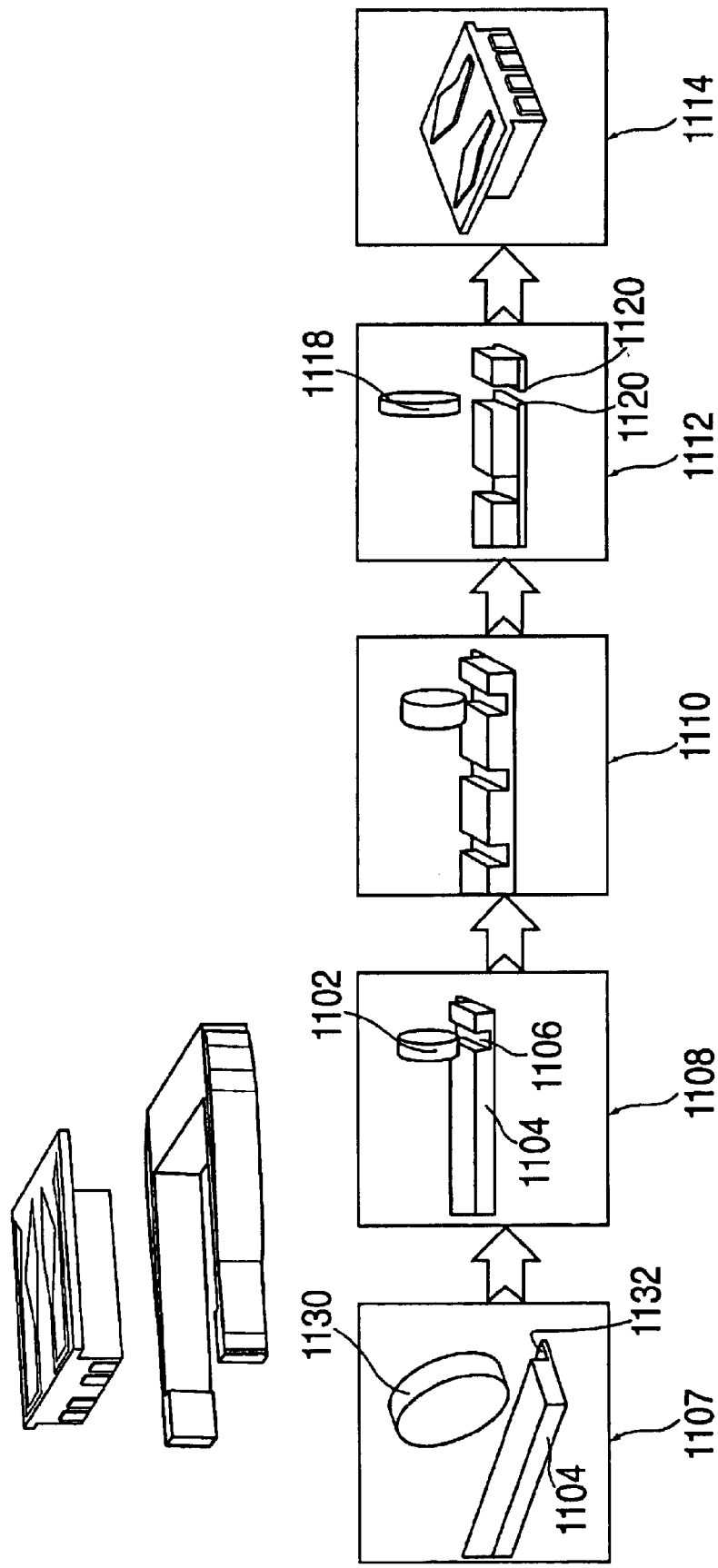
FIG. 11 illustrates the fabrication of a third slider design under principles of the present invention.

FIG. 11 illustrates the fabrication of Design 3 under principles of the present invention. In one embodiment, a cutting wheel 1130 is utilized to cut 1107 a step 1132 of a prescribed depth into a row bar 1104. Next, similar to the manufacturing process of Design 2, a cutting wheel 1102 is utilized to cut 1108 a groove 1106 in the bar 1104. The process is repeated 1110 with a prescribed separation between grooves. In an embodiment, the bar is next cut completely through 1112 with a thinner cutting wheel 1118, yielding steps 1120 on each separated unit. This process is repeated, yielding 1114 individual sliders 1122, having steps on three sides.

Figure 12:
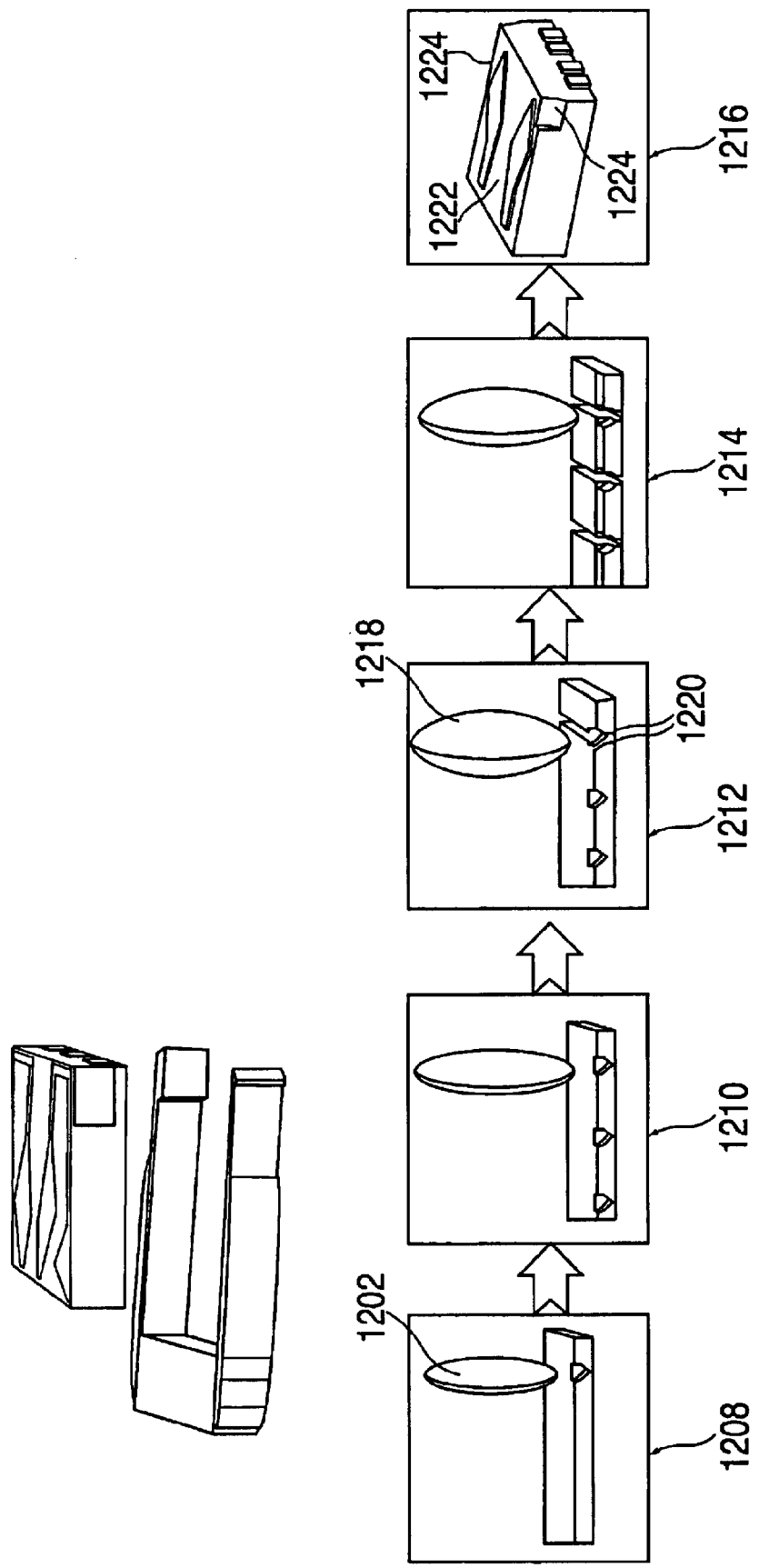
FIG. 12 illustrates the fabrication of a fourth slider design under principles of the present invention.

FIG. 12 illustrates the fabrication of Design 4 under principles of the present invention. In one embodiment, a cutting wheel 1202 with a rounded edge is utilized to cut 1208 a decreasing-radius slit 1206 in a row bar 1204. The bar 1204 is cut to a prescribed depth and for a prescribed distance in a direction perpendicular to the length (axis) of the bar 1204, yielding this slit 1206. The process is repeated 1210 with a prescribed separation between slits. In an embodiment, the bar is next cut completely through 1212 with a thinner cutting wheel 1018, yielding recessed areas (planes) 1220 of decreasing depth on each separated unit. This process is repeated 1214, yielding 1216 individual sliders 1222, having recessed areas 1224 on each side.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method to join an actuator element to a slider element comprising:

adapting a slider element to be coupled to an actuator element having a generally 'U'-shaped structure, the 'U'-shaped structure being formed by at least a first arm joined at one end to an actuator base and a second arm joined at one end to said actuator base, said first arm having a first raised portion of a first contour and said second arm having a second raised portion of a second contour generally opposing in direction and generally parallel to said first raised portion of said first contour;

adapting said slider element to have a first surface with a first recessed portion contoured to accept, for non-rotatable coupling, said first raised portion and a second surface with a second recessed portion contoured to accept for non-rotate-able coupling said second raised portion;

bonding within said first recessed portion said first raised portion by a bonding agent; and bonding within said second recessed portion said second raised portion by said bonding agent.

2. The method of claim 1, wherein the actuator element is a micro-actuator and the slider element is a side step slider.

3. The method of claim 2, wherein the micro-actuator is a piezoelectric micro-actuator.

4. The method of claim 3, wherein the bonding agent is epoxy.

5. The method of claim 4, wherein the contours of said first raised portion with said first recessed portion and the contours of said second raised portion with said second recessed portion prevent rotational movement of the slider during a curing process of said epoxy.

6. The method of claim 1, wherein said slider is generally box-shaped and is formed with said first and second recessed portions by:
   cutting a rectangular-surfaced large bar of a slider material in a direction perpendicular to the length of said large bar to form a rectangular-surfaced small bar, the length for which is perpendicular to said length of said large bar;
   cutting a prescribed depth lengthwise along a first surface of the small bar to form said first recessed portion and cutting said prescribed depth lengthwise along a second surface of the small bar to form said second recessed portion, said second surface being generally parallel to said first surface; and
   cutting the small bar perpendicular to the length of the small bar.

7. A method to join an actuator element to a slider element comprising:
   adapting a slider element to be coupled to an actuator element having a generally 'U'-shaped structure, the 'U'-shaped structure being formed by at least a first arm joined at one end to an actuator base and a second arm joined at one end to said actuator base and generally parallel to said first arm;
   adapting said slider element to have a first recessed planar surface to form a first step and a second recessed planar surface to form a second step generally parallel and generally opposite in direction from the first step to accept, for non-rotatable coupling, said actuator, the first step to accept the first arm and the second step to accept the second arm;
   bonding within said first step said first arm by a bonding agent; and
   bonding within said second step said second arm by said bonding agent.

8. The method of claim 7, wherein the actuator element is a micro-actuator and the slider element is a side step slider.

9. The method of claim 8, wherein the micro-actuator is a piezoelectric micro-actuator.

10. The method of claim 9, wherein the bonding agent is epoxy.

11. The method of claim 10, wherein the first step accepts the first arm and the second step accepts the second arm to prevent rotational movement of the slider during a curing process of said epoxy.

12. The method of claim 11, wherein said slider has a third recessed planar surface forming a third step that is generally perpendicular to the first and second steps.

13. The method of claim 12, wherein said slider has said third recessed planar surface forming said third step to reduce slider weight.

14. The method of claim 13, wherein said slider is generally box-shaped and is formed with said first, second, and third steps by:
   cutting to a depth with a tool of a first cutting width a rectangular-surfaced bar of a slider material in a direction parallel to the length of said bar;
   cutting a groove to a depth with a tool of a second cutting width said bar in a direction perpendicular to the length of said bar at a location; and
   cutting through said bar in said direction perpendicular to the length at said location with a tool of a cutting width less than said second cutting width.

15. The method of claim 7, wherein said slider is generally box-shaped and is formed with said first and second steps by:
   cutting a groove to a prescribed depth with a tool of a first cutting width a rectangular-surfaced bar of a slider material in a direction perpendicular to the length of said bar at a location; and
   cutting through said bar in a direction perpendicular to the length at said location with a tool of a cutting width less than said first cutting width.

16. A method to join an actuator element to a slider element comprising
   a slider element adapted to be coupled to an actuator element having a generally 'U'-shaped structure, the 'U'-shaped structure being formed by at least a first arm joined at one end to an actuator base and a second arm joined at one end to said actuator base, said first arm having a first bonding surface and said second arm having a second bonding surface that is generally opposing in direction and generally parallel to said first surface;
   said slider element having a first bonding surface with a first recessed portion contoured to partially butt said first arm bonding surface and to provide a partial cleft with said first arm bonding surface and a second bonding surface; wherein
   said first slider bonding surface is to bond with said first arm bonding surface; and said second slider bonding surface is to bond with said second arm bonding surface.

17. The method of claim 16, wherein the actuator element is a micro-actuator and the slider element is a side step slider.

18. The method of claim 17, wherein the micro-actuator is a piezoelectric micro-actuator.

19. The method of claim 18, wherein the bonding agent is epoxy.

20. The method of claim 19, wherein said first slider bonding surface partially butts said first arm bonding surface, providing said partial cleft, and said second slider bonding surface partially butts said second arm bonding surface, providing said partial cleft, to prevent epoxy overflow.

21. The method of claim 16, wherein said slider is generally box-shaped and is formed by:
   cutting a slot in a bar of a prescribed length perpendicular to the length of said bar at a location and to a prescribed depth with a tool of a first cutting width, said bar being rectangular-surfaced; and
   cutting through said bar in said direction perpendicular to the length at said location with a tool of a cutting width less than said first cutting width.

* * * * *

UNITED STATES PATENT AND TRADEMARK OFFICE
CERTIFICATE OF CORRECTION

PATENT NO. : 6,751,069 B2  
DATED : June 15, 2004  
INVENTOR(S) : Ming Gao Yao et al.

Page 1 of 1

It is certified that error appears in the above-identified patent and that said Letters Patent is hereby corrected as shown below:

Column 2,
Line 27, please delete the word "Nits".

Signed and Sealed this

Twenty-eighth Day of June, 2005

JON W. DUDAS
*Director of the United States Patent and Trademark Office*